(12) United States Patent
Xu et al.

(10) Patent No.: US 12,269,323 B2
(45) Date of Patent: Apr. 8, 2025

(54) SEALING SYSTEM FOR CONNECTING DRAINAGE DEVICE TO VEHICLE WINDOW GLASS

(71) Applicant: SAINT-GOBAIN GLASS FRANCE, Courbevoie (FR)

(72) Inventors: Yang Xu, Shanghai (CN); Tao He, Shanghai (CN); Jing Yu, Shanghai (CN); Bin Zhu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 206 days.

(21) Appl. No.: 17/792,944

(22) PCT Filed: Jan. 18, 2021

(86) PCT No.: PCT/CN2021/072380
§ 371 (c)(1),
(2) Date: Jul. 14, 2022

(87) PCT Pub. No.: WO2021/147791
PCT Pub. Date: Jul. 29, 2021

(65) Prior Publication Data
US 2023/0049818 A1    Feb. 16, 2023

(30) Foreign Application Priority Data

Jan. 20, 2020 (CN) .......................... 202010064465.9
Jan. 20, 2020 (CN) .......................... 202020128853.4

(51) Int. Cl.
*B60J 10/70* (2016.01)
*B60J 10/20* (2016.01)
*B60J 10/25* (2016.01)

(52) U.S. Cl.
CPC ............... *B60J 10/70* (2016.02); *B60J 10/20* (2016.02); *B60J 10/25* (2016.02)

(58) Field of Classification Search
CPC ... B60J 10/70; B60J 10/18; B60J 10/30; B60J 10/34; B60J 10/25; B60J 10/15; B60J 10/20; B60J 1/02
See application file for complete search history.

(56) References Cited

U.S. PATENT DOCUMENTS 5,261,721 A * 11/1993 Conger .................. B60J 1/14
                                                     49/475.1
6,769,700 B2 * 8/2004 Ortmuller ............. B60J 10/18
                                                      277/921

(Continued)

FOREIGN PATENT DOCUMENTS

CN        1210172 C       7/2005
CN       102036844 A      4/2011
(Continued)

OTHER PUBLICATIONS

International Search Report as issued in International Patent Application No. PCT/CN2021/072380, dated Apr. 15, 2021.

(Continued)

*Primary Examiner* — Justin B Rephann
(74) *Attorney, Agent, or Firm* — Pillsbury Winthrop Shaw Pittman LLP

(57) ABSTRACT

A sealing system for connecting a drainage device to a vehicle window, includes a fixing section for being connected to the vehicle window glass and an engaging section for being detachably connected to the drainage device, the engaging section including a supporting body, an elastic arm, and a transition portion connecting the supporting body to the elastic arm; wherein the sealing system further includes a positioning element connected to the transition portion and the supporting body, the positioning element being at least partially elastically deformable; further, the positioning element includes an elastic leg connected to the transition portion and an engaging head connected to the (Continued)

supporting body, the engaging head having a cross section presenting a U-shape or V-shape, and the U-shape or the V-shape having an opening oriented towards the supporting body.

16 Claims, 4 Drawing Sheets

(56) References Cited

U.S. PATENT DOCUMENTS

| | | | | |
|---|---|---|---|---|
| 7,837,251 | B2* | 11/2010 | Rich | B60J 10/24 |
| | | | | 49/490.1 |
| 8,251,432 | B2* | 8/2012 | Schaff | B60J 10/18 |
| | | | | 296/93 |
| 8,393,668 | B2* | 3/2013 | Timmermann | B60J 10/35 |
| | | | | 296/84.1 |
| 8,628,137 | B2* | 1/2014 | Platt | B60J 10/30 |
| | | | | 296/84.1 |
| 9,073,421 | B2* | 7/2015 | Deussen | B60J 10/30 |
| 9,126,635 | B2* | 9/2015 | Sano | B60J 10/70 |
| 9,168,879 | B2* | 10/2015 | Timmermann | B60J 10/70 |
| 9,259,994 | B2* | 2/2016 | Erner | B60J 1/004 |
| 9,586,465 | B2* | 3/2017 | Sanada | B60J 1/02 |
| 9,694,659 | B2* | 7/2017 | Timmermann | B60J 10/30 |
| 9,994,094 | B2* | 6/2018 | Ortmueller | B60J 10/70 |
| 10,118,474 | B2* | 11/2018 | Ratiu | B60J 10/27 |
| 10,189,336 | B2* | 1/2019 | Dalmasso | B60J 10/70 |
| 10,414,259 | B2* | 9/2019 | Ortmueller | B60J 10/70 |
| 10,525,808 | B2* | 1/2020 | Schoch | B60J 10/32 |
| 10,611,221 | B2* | 4/2020 | Schlater | B60J 10/70 |
| 10,625,576 | B2* | 4/2020 | Kuster | B32B 17/10036 |
| 10,752,100 | B2* | 8/2020 | Schoch | B60J 10/32 |
| 11,034,224 | B2* | 6/2021 | Bergmann | B60J 10/70 |
| 11,660,945 | B2* | 5/2023 | Muylkens | B60J 10/18 |
| | | | | 49/476.1 |
| 2003/0057660 | A1* | 3/2003 | Ortmuller | B60J 10/265 |
| | | | | 277/628 |
| 2007/0246966 | A1* | 10/2007 | Polke | B60J 10/45 |
| | | | | 296/93 |
| 2010/0320797 | A1* | 12/2010 | Schlater | B60J 10/70 |
| | | | | 296/93 |
| 2011/0018303 | A1* | 1/2011 | Timmermann | B60J 10/345 |
| | | | | 296/90 |
| 2011/0115261 | A1* | 5/2011 | Platt | B60J 10/70 |
| | | | | 296/208 |
| 2011/0181071 | A1* | 7/2011 | Schaff | B60J 10/18 |
| | | | | 296/93 |
| 2011/0285177 | A1* | 11/2011 | Flammer | B60J 10/265 |
| | | | | 296/208 |
| 2012/0126567 | A1* | 5/2012 | Timmermann | B60J 10/70 |
| | | | | 29/428 |
| 2014/0062037 | A1 | 3/2014 | Platt et al. | |
| 2014/0346803 | A1* | 11/2014 | Timmermann | B60J 10/70 |
| | | | | 29/446 |
| 2014/0367989 | A1* | 12/2014 | Erner | B60J 10/34 |
| | | | | 428/192 |
| 2015/0246603 | A1* | 9/2015 | Silvestrini | B60J 10/24 |
| | | | | 296/93 |
| 2016/0001645 | A1* | 1/2016 | Ortmueller | B60J 10/20 |
| | | | | 403/288 |
| 2016/0101675 | A1* | 4/2016 | Timmermann | B62D 25/081 |
| | | | | 296/93 |
| 2016/0229278 | A1* | 8/2016 | Timmermann | E06B 7/23 |
| 2017/0028832 | A1* | 2/2017 | Sekishiro | B60J 1/006 |
| 2017/0267084 | A1* | 9/2017 | Schoch | B60J 1/02 |
| 2018/0134134 | A1* | 5/2018 | Lin | B60J 10/70 |

FOREIGN PATENT DOCUMENTS

| | | |
|---|---|---|
| CN | 102245415 A | 11/2011 |
| CN | 103260922 A | 8/2013 |
| CN | 104010853 A | 8/2014 |
| CN | 104553704 A | 4/2015 |
| CN | 104890483 A | 9/2015 |
| CN | 105189164 A | 12/2015 |
| CN | 106114169 A | 11/2016 |
| CN | 212555783 U | 2/2021 |
| DE | 20 2005 003789 U1 | 5/2005 |
| DE | 20 2008 013133 U1 | 2/2010 |
| JP | 2012-240454 A | 12/2012 |

OTHER PUBLICATIONS

First Office Action as issued in Chinese Patent Application No. 202010064465.9, dated Jun. 7, 2024.

* cited by examiner

SEALING SYSTEM FOR CONNECTING DRAINAGE DEVICE TO VEHICLE WINDOW GLASS

CROSS-REFERENCE TO RELATED APPLICATIONS

This application is the U.S. National Stage of PCT/CN2021/072380, filed Jan. 18, 2021, which in turn claims priority to Chinese patent application number 202010064465.9 filed Jan. 20, 2020 and Chinese patent application number 202020128853.4 filed Jan. 20, 2020. The content of these applications are incorporated herein by reference in their entireties.

RELATED FIELD

The present disclosure relates to a vehicle sub-component, in particular to a sealing system for connecting a drainage device to a vehicle window glass.

BACKGROUND

In order to facilitate draining water flowing down from a vehicle window glass (especially the front windshield) to the outside of the vehicle so as to avoid damage to the engine and other components in the vehicle, a sealing system (also called "a lower engaging strip") is generally used to connect the vehicle window glass with a drainage device (such as a water tank) in the prior art.

For example, the patent CN1210172C discloses an irregular part used as a sealing system of a vehicle windshield, which includes a contact surface section for being fixed on a lower margin of the windshield and a section with a hook-shaped cross section; on one hand, the vehicle glass is fixed to the irregular part by bonding at the contact surface section, and on the other hand, a water tank is fixed to the irregular part by introducing a rib on the water tank cover into the above-mentioned section with a hook-shaped cross section.

SUMMARY

However, since a drainage device (such as a water tank) generally has dimensional tolerances, during a mounting process of introducing the drainage device into a sealing system, it is generally difficult or requires a large force to introduce the drainage device into the above-mentioned sealing system. Moreover, the problem of ejection of the drainage device often occurs after mounting, thereby causing water leakage.

The embodiments of the present disclosure provide a sealing system for connecting a drainage device to a vehicle window glass, which solves or at least partially solves the above-mentioned problems and other potential problems in the process of mounting the drainage device to the sealing system in the prior art.

Specifically, the present disclosure provides a sealing system 100 for connecting a drainage device 200 to a vehicle window glass 300, comprising:
 a fixing section 110 configured to be connected to the vehicle window glass 300; and
 an engaging section 120 configured to be detachably connected to the drainage device 200, the engaging section 120 comprising a supporting body 121, an elastic arm 122, and a transition portion 123 connecting the supporting body 121 to the elastic arm 122;

wherein the sealing system 100 further comprises a positioning element 130 connected to the transition portion 123 and the supporting body 121, the positioning element 130 being at least partially elastically deformable;
 further, the positioning element 130 comprises an elastic leg 131 connected to the transition portion 123 and an engaging head 132 connected to the supporting body 121, the engaging head 132 having a cross section presenting a U-shape or V-shape, and the U-shape or the V-shape having an opening oriented towards the supporting body 121.

A basic idea is that, when the drainage device 200 is mounted/introduced into the engaging section 120 of the sealing system 100, since the positioning element 130 is at least partially elastically deformable, the engaging head 132 deforms and moves towards the orientation of the opening of the U-shape or the V-shape (for example, the supporting body 121), such that the drainage device 200 can be easily introduced into the sealing system 100.

After the rib 210 of the drainage device is completely introduced into the sealing system 100, a protruding portion of the free end of the rib 210 exceeds the engaging head 132, which relatively reduces the force acting on the engaging head 132, such that the engaging head 132 can partially rebound to abut against the rib 210 of the drainage device, thereby fixing the drainage device 200 to the sealing system 100. At this time, a first side 1321 and a second side 1322 of the engaging head 132 with the U-shaped or the V-shaped cross section extending along the length direction of the sealing system 100 (that is, the direction perpendicular to the paper surface) are both located on the rib 210. In order to pull the rib 210 of the drainage device out of the sealing system 100, it is required to overcome the resistance of the first side 1321 and the second side 1322 on the rib 210 at the same time, which obviously requires a larger force.

In summary, according to the design of the present disclosure, it is easier to mount the drainage device to the sealing system, and it requires a larger force to pull the drainage device out of the sealing system, such that the drainage device can still remain on the sealing system after a long period of bump and use.

It should be understood that the summary section is not intended to determine the key or basic features of the embodiments of the present disclosure, nor is it intended to limit the scope of the present disclosure. Other features of the present disclosure will become easy to understand through the following description.

BRIEF DESCRIPTION OF THE DRAWINGS

In order to better understand the objects, features, and advantages of the present disclosure, the present disclosure will be described in more detail in the following with reference to the drawings.

Throughout the drawings, same or similar reference signs are used to denote the same or similar elements.

DETAILED DESCRIPTION

The present disclosure will be further described below with reference to the following embodiments, such that those skilled in the art can fully understand the present disclosure, but it should be understood that, description of these embodiments is only to enable those skilled in the art to better understand and implement the subject matter described herein, and in no means is limitation to the scope, applicability, or embodiments set forth in the claims. It should be understood that, various features may be omitted, substituted, or added as needed for these embodiments without departing from the protection scope of the present disclosure. In addition, features described in some embodiments may also be combined in other embodiments.

In the present disclosure, the term "including" and various variants thereof should be explained as open terms, which means "including but not limited to". The term "an embodiment" should be explained as "at least one embodiment". The term "another embodiment" should be explained as "at least one other embodiment". Other terms that may appear but are not mentioned here, unless explicitly stated, should not be interpreted or defined in a manner that is contradictory to the concept on which the embodiments of the present disclosure are based.

Figure 1:
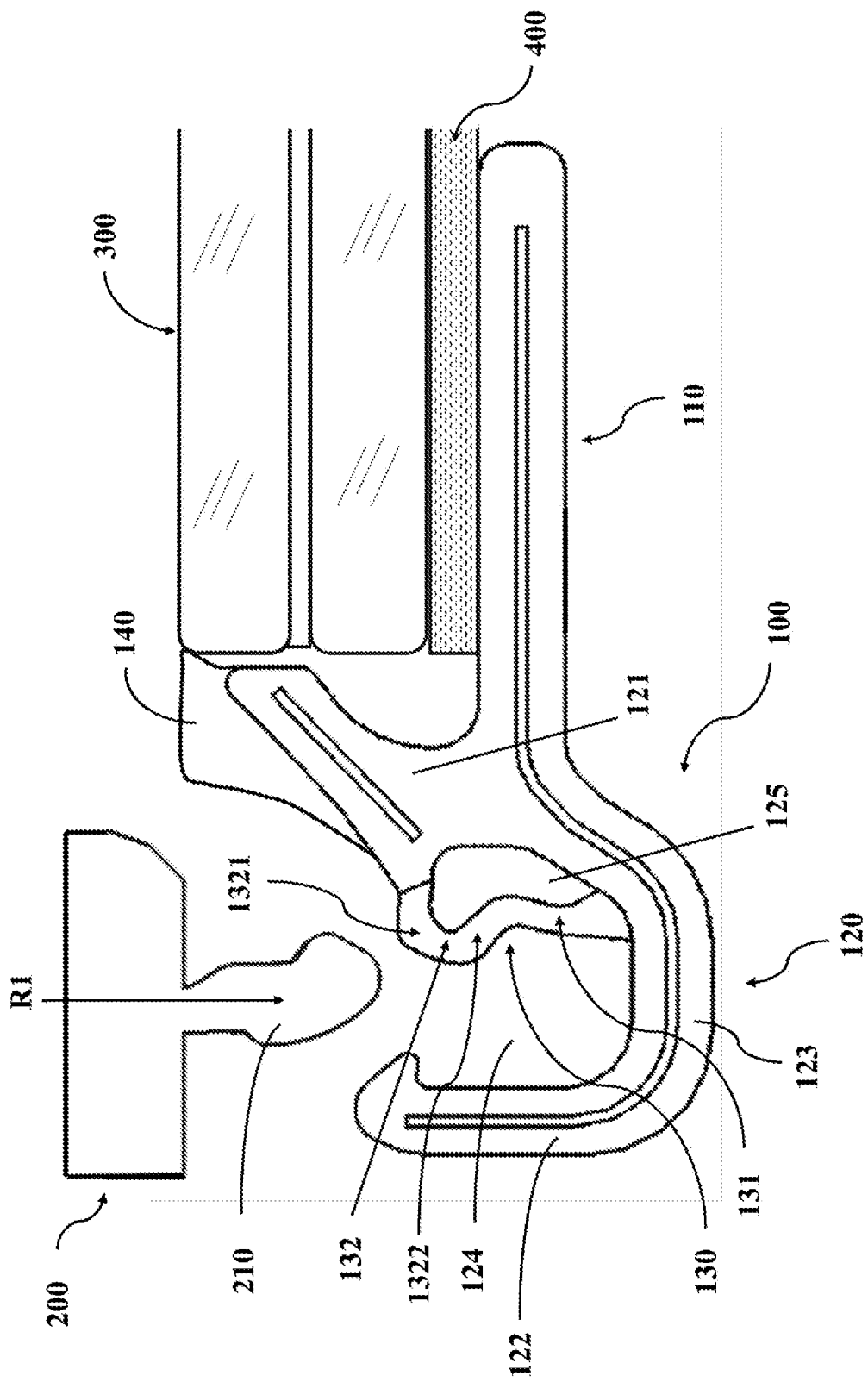
FIG. 1 is a cross-sectional view of the sealing system according to the present disclosure in the unmounted state.

The following firstly introduces the cross-sectional view of the sealing system 100 configured to connect the drainage device 200 to the vehicle window glass 300 in an unmounted state according to the present disclosure with reference to FIG. 1. The length of the sealing system 100 refers to a length extending in a direction perpendicular to the paper surface of the drawing, and is substantially the same as the length of the lower margins of the drainage device 200 and the vehicle window glass 300. It should be understood that, without departing from the principle and spirit of the present disclosure, the length of the sealing system 100 may be greater or less than the length of the lower margin of the vehicle window glass 300. In addition, it should be understood that although several specific elements are shown here, those skilled in the art may add one or more elements to them, delete one or more elements from them, or replace one or more elements with other elements, without departing from the principle and spirit of the present disclosure.

As shown in FIG. 1, the sealing system 100 according to the present disclosure includes a fixing section 110 configured to be connected to the vehicle window glass 300. The fixing section 110 may be connected to the vehicle window glass 300 through an adhesive layer 400. The adhesive layer 400 is preferably an adhesive film or an adhesive strip (for example, a double-sided tape) applied on the fixing section 110.

The sealing system 100 according to the present disclosure further includes an engaging section 120 configured to be detachably connected to the drainage device 200. The drainage device 200 has an elastic rib 210 through which the drainage device 200 can be fixed into the sealing system 100.

The above-mentioned engaging section 120 includes a supporting body 121, an elastic arm 122, and a transition portion 123 connecting the supporting body 121 to the elastic arm 122. As shown in FIG. 1, the supporting body 121 has a cross section substantially presenting a T-shape or L-shape, and is located between the drainage device 200 and the vehicle window glass 300 after mounting. The free end of the elastic arm 122 has a cross section presenting a hook-shape or inverted L-shape, and the specific geometric structure of the free end can be adjusted according to the shape of the rib 210 of the drainage device. The dimension of the opening between the elastic arm 122 and the supporting body 121 can also be adjusted according to the dimension of the rib 210 of the drainage device.

The sealing system 100 further includes a positioning element 130 connected to the transition portion 123 and the supporting body 121, and the positioning element 130 is at least partially elastically deformable. A groove portion formed by the positioning element 130 and the elastic arm 122 is referred to a positioning groove 124, and a groove formed by the positioning element 130 and the supporting body 121 is referred to a hollow groove 125.

The structure of the sealing system 100 is briefly introduced above. The drainage device 200 is fixed to the sealing system 100 through the material and geometric design of the components of the engaging section 120, wherein the design of the positioning element 130 is particularly critical, as it is very critical for whether the drainage device can be easily mounted, and for ensuring a secure connection between the drainage device and the sealing system.

As described above, the positioning element 130 is at least partially elastically deformable. Besides, according to the present disclosure, the positioning element 130 includes an elastic leg 131 connected to the transition portion 123 and an engaging head 132 connected to the supporting body 121, the engaging head 132 has a cross section presenting a U-shape or V-shape, and the U-shape or the V-shape has an opening oriented towards the supporting body 121.

Figure 2:
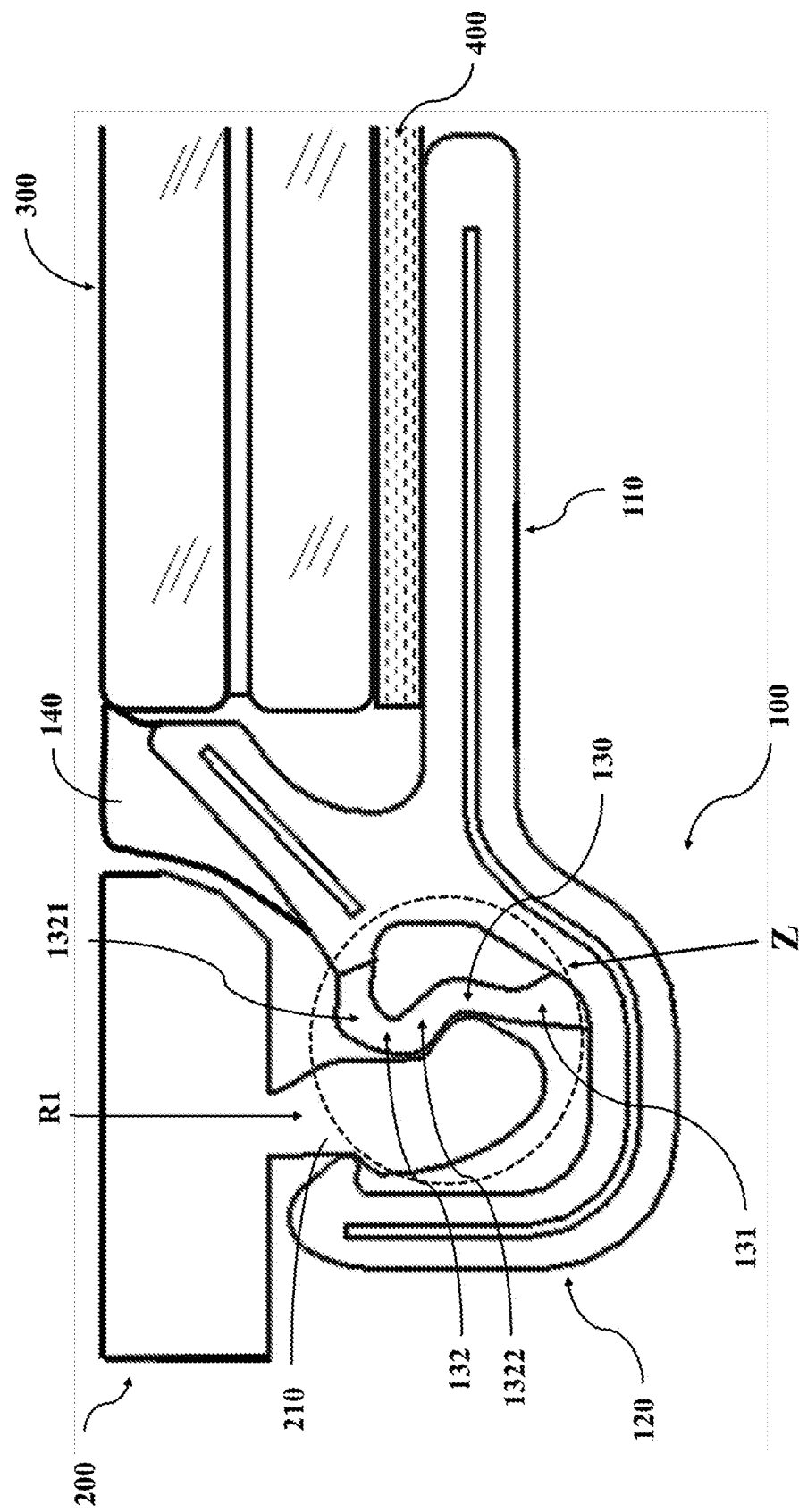
FIG. 2 is a cross-sectional view of the sealing system according to the present disclosure in the mounted state.

As shown in FIG. 2, based on the material and geometric characteristics of the positioning element 130, especially the material and geometric characteristics of the engaging head 132, when the drainage device 200 is mounted/introduced into the engaging section 120 of the sealing system 100, since the positioning element 130 is at least partially elastically deformed, the engaging head 132 deforms and moves towards the orientation of the opening of the U-shape or the V-shape (for example, the supporting body 121) under the action of the force acting on the rib 210 in the direction of R1, such that the drainage device 200 can be easily introduced into the sealing system 100.

After the rib 210 of the drainage device is completely mounted to the sealing system 100, a protruding portion of the free end of the rib 210 exceeds the engaging head 132, which relatively reduces the force acting on the engaging head 132, such that the engaging head 132 can partially rebound to abut against the rib 210 of the drainage device, thereby fixing the drainage device 200 to the sealing system 100. At this time, a first side 1321 and a second side 1322 of the engaging head 132 with the U-shaped or the V-shaped cross section extending along the length direction of the sealing system 100 (that is, the direction perpendicular to the paper surface) are both located on the rib 210. In order to pull the rib 210 of the drainage device out of the sealing system 100, it is required to overcome the resistance of the first side 1321 and the second side 1322 on the rib 210 at the same time, which obviously requires a larger force.

Tests have shown that, in some embodiments according to the present disclosure, during a mounting process of introducing the rib 210 of the drainage device into the positioning groove 124 to fix the drainage device 200 to the sealing system 300, the required maximum insertion force $F_{Insertion}$ is less than or equal to 2N; the maximum extraction force $F_{Extraction}$ required to pull the rib 210 of the drainage device out of the sealing system 300 is greater than or equal to 3N. In some preferred embodiments, the maximum insertion force $F_{Insertion}$ is less than or equal to 1.5N, and the maximum extraction force $F_{Extraction}$ is greater than or equal to 3N and less than or equal to 5N.

Therefore, based on the above design, it is easier to mount the drainage device to the sealing system, which can greatly shorten the mounting time for workers and improve production efficiency; while it requires a larger force to pull out the rib of the drainage device, such that the drainage device can still remain in the sealing system after a long period of bump and use, which improves product stability.

Apparently, it should be understood that, although several specific shapes (that is, U-shape or V-shape) of the cross section of the engaging head 132 are shown here, this is not intended to limit the protection scope of the present disclosure, and any other suitable shapes are also applicable without departing from the principle and spirit of the present disclosure. For example, in some alternative embodiments, the shape of the cross section of the engaging head 132 may be a W-shape or other similar shape with a protruding curved structure. In some other embodiments, one end of the engaging head 132 is connected to one end of the elastic leg 131, and the cross section of the positioning element 130 presents a barb-shape as a whole.

In order to facilitate draining water flowing down from the vehicle window glass into the drainage device 200, the geometric design of the sealing system 100 satisfies that, the drainage device 200, the vehicle window glass 300 and the sealing system 100 have flush outer surfaces after mounting the drainage device 200 to the sealing system 100.

Figure 3:
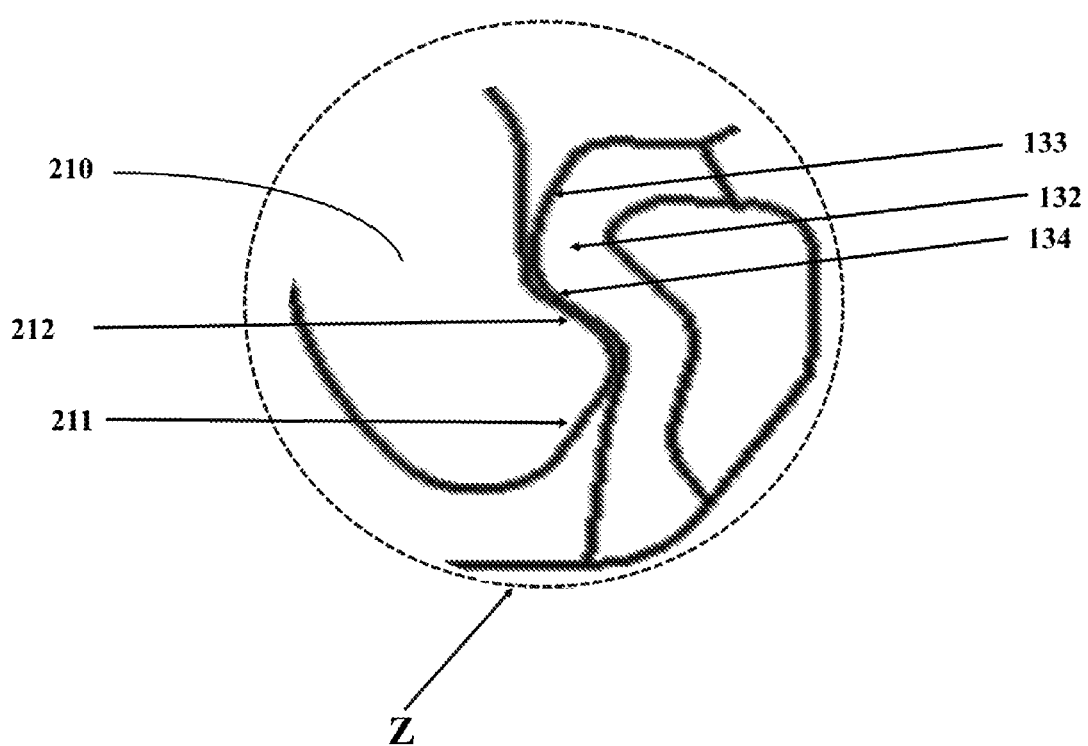
FIG. 3 is a detailed enlarged view of the zone Z in FIG. 2.

In order to better understand the engaging principle of the rib 210 of the drainage device with the positioning element 130 of the sealing system, FIG. 3 further shows a detailed enlarged view of the zone Z in FIG. 2.

As shown in FIG. 3, the rib 210 of the drainage device has an introducing surface 211 located at a lower margin of the longitudinal edge of the rib and an engaging surface 212 located at an upper margin of the longitudinal edge of the rib. The engaging head 132 of the positioning element has a joint guiding surface 133 located at an upper margin of the longitudinal edge of the engaging head 132 and an engaging surface 134 located at a lower margin of the longitudinal edge of the engaging head 132. When the rib 210 of the drainage device is introduced downwards into the positioning groove 124, the introducing surface 211 of the rib 210 firstly contacts the joint guiding surface 133 of the engaging head 132 and laterally presses the engaging head 132, such that the engaging head 132 deforms and moves towards the supporting body 121. After the rib 210 of the drainage device is completely introduced into the positioning groove 124, the engaging surface 134 of the deformed engaging head 132 abuts against the engaging surface 212 of the rib 210 of the drainage device, such that the drainage device 200 can be fixed into the sealing system 100. Conversely, when the drainage device 200 is removed from the sealing system 100, since the first side 1321 and the second side 1322 of the engaging head 132 with the U-shaped or the V-shaped cross section extending along the length direction of the sealing system 100 are both located on the engaging surface 212 of the rib 210, in order to pull the rib 210 of the drainage device out of the sealing system 100, it is required to overcome the resistance of the first side 1321 and the second side 1322 on the rib 210 at the same time, which obviously requires a larger force. It should be understood that, although exemplary shapes (for example, an inclined plane) of the cross sections of the introducing surface 211 and the engaging surface 212 of the rib 210 of the drainage device, and of the joint guiding surface 133 and the engaging surface 134 of the engaging head 132 of the positioning element have been shown in FIGS. 1 to 3, this is not intended to limit the protection scope of the present disclosure. Any other suitable shape is also possible without departing from the principle and spirit of the present disclosure. For example, in some alternative embodiments, the introducing surface 211 and the engaging surface 212 of the rib 210 of the drainage device, and the joint guiding surface 133 and the engaging surface 134 of the engaging head 132 of the positioning element may present curved surfaces.

As shown in FIGS. 1 and 2, in order to compensate the dimensional tolerances of the drainage device 200, the sealing system according to the present disclosure may further be provided with a sealing element 140 on the supporting body 121, such that the problem of water leakage caused by the excessively large gap between the supporting body 121 of the sealing system and the drainage device can be avoided, and the problem of difficult mounting caused by the excessively small gap between them can also be avoided. This makes the sealing system of the present disclosure more widely applicable.

The sealing element 140 is at least partially elastic and can be at least partially elastically deformed. In some specific embodiments, the sealing element 140 is made of elastic material such as thermoplastic elastomer (TPE). In some specific embodiments, the thermoplastic elastomer (TPE) includes thermoplastic polyurethane (TPU) and/or thermoplastic vulcanizate (TPV). Further, the selection of the above-mentioned materials is also beneficial to reduce wind noise generated between the sealing system and the vehicle window glass during driving of the vehicle.

In addition, it should be understood that, without departing from the principle and spirit of the present disclosure, the sealing element 140 may be a solid body or a hollow body; and the sealing element 140 may be connected to the supporting body 121 of the sealing system via a contact surface 141, or they may be integrally formed.

In order to facilitate draining water flowing down from the vehicle window glass into the drainage device 200, the geometric designs of the supporting body 121 and the sealing element 140 satisfy that: the vehicle window glass 300, the sealing element 140 and the drainage device 200 have substantially flush outer surfaces after mounting the drainage device 200 into the sealing system 100.

As described above, according to the sealing system of the present disclosure, the positioning element 130 is at least partially elastic and can be at least partially elastically deformed. In some specific embodiments, the positioning element 130 is made of elastic material such as thermoplastic elastomer (TPE). In some specific embodiments, the thermoplastic elastomer (TPE) includes thermoplastic polyurethane (TPU) and/or thermoplastic vulcanizate (TPV).

Except the positioning element 130 and the sealing element 140 described above, other sections and/or elements of the sealing system may be made of relatively hard materials (such as thermoplastic or thermosetting materials). For example, the fixing section 110 and the engaging section 120 are made of one or a combination of the following materials: polyvinyl chloride (PVC), polypropylene (PP), acrylonitrile-butadiene-styrene plastic (ABS), polyurethane (PU), polyethylene terephthalate (PET), and ethylene propylene diene monomer (EPDM).

Figure 4:
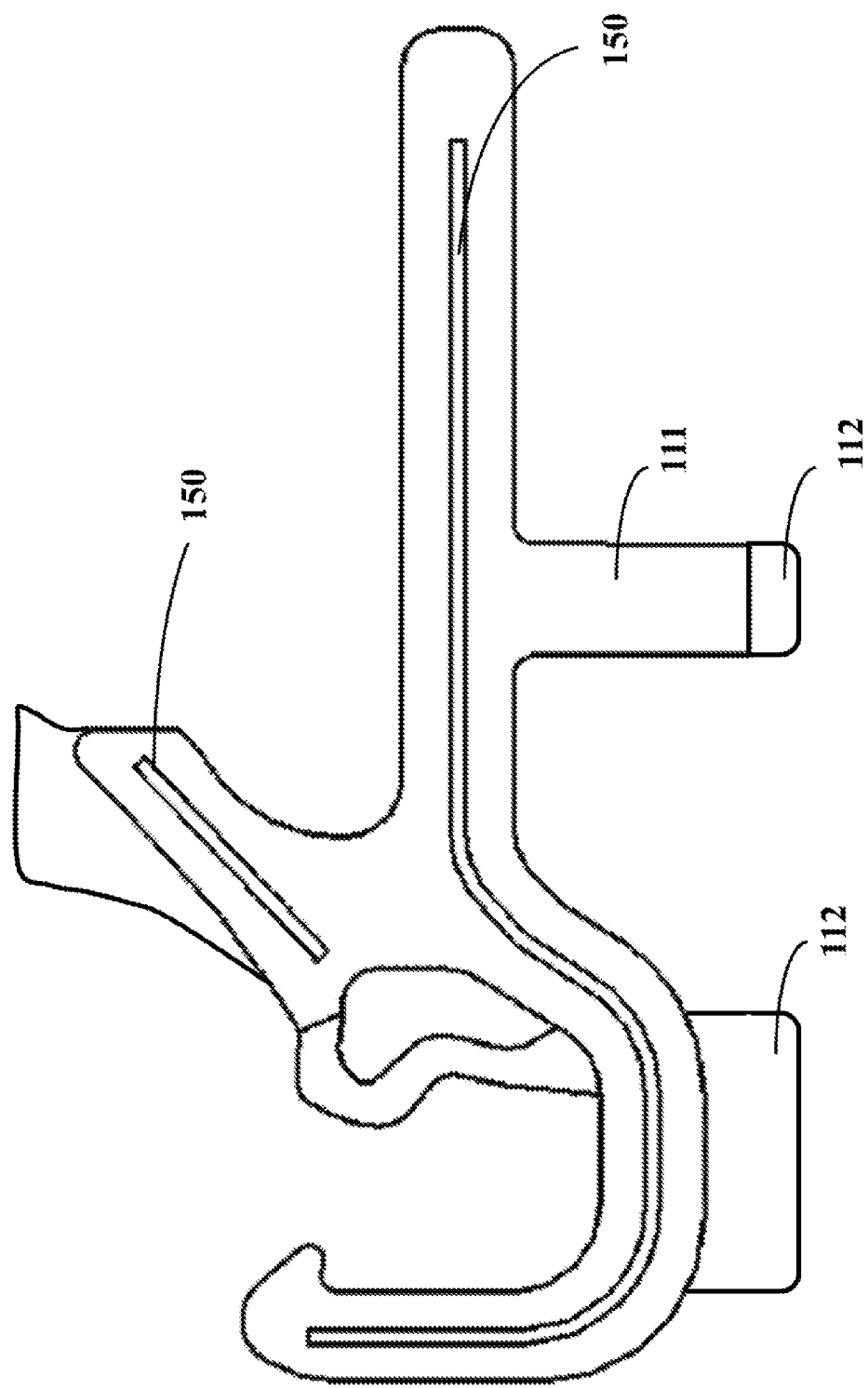
FIG. 4 is a cross-sectional view of the sealing system according to another embodiment of the present disclosure.

Besides, as shown in FIG. 4, there is usually a certain distance between the sealing system and the sheet metal of the vehicle body. In order to fix the sealing system 100 on the vehicle body, in some embodiments, the fixing section 110 of the sealing system according to the present disclosure further includes a supporting rib 111 on a side away from the glass. Similar to the materials of the fixing section 110 and the engaging section 120 described above, the supporting rib 111 may be made of one or a combination of the following materials: polyvinyl chloride (PVC), polypropylene (PP), acrylonitrile-butadiene-styrene plastic (ABS), polyurethane (PU), polyethylene terephthalate (PET), and ethylene propylene diene monomer (EPDM).

Further, in some embodiments, a buffering portion 112 is further provided at the end of the supporting rib 111 away from the fixing section 110. Similarly, the engaging section 120 also includes a buffering portion 112 on a side of the transition portion 123 away from the positioning element 130. Similar to the materials of the positioning element 130 and the sealing element 140 described above, the buffering portion 112 is made of elastic material such as thermoplastic elastomer (TPE). In some specific embodiments, the thermoplastic elastomer (TPE) includes thermoplastic polyurethane (TPU) and/or thermoplastic vulcanizate (TPV). The arrangement of the buffering portion 112 can provide buffer and shock absorption between the sealing system 100 and the sheet metal of the vehicle body, and reduce noise caused by vibration of the vehicle body.

In some preferred embodiments, the fixing section 110 and the engaging section 120 further include a reinforcing insert 150 including metal, organic polymer, or synthetic material. In some embodiments, the metal reinforcing insert is, for example, an aluminum strip or a steel strip. By providing the reinforcing insert, the stability of the fixing section 110 and the engaging section 120 can be further improved.

The sealing system according to the present disclosure may be prepared by extrusion molding. In some embodiments, the sealing system may be formed at one time by extrusion molding. In some embodiments, the fixing section 110, the engaging section 120 and/or the supporting rib 111 made of material with relatively high hardness may be firstly formed by extrusion molding, and the positioning element 130, then the sealing element 140 and/or the buffering portion 112 made of material with relatively low hardness may be formed by secondary extrusion molding.

It should be understood that, the above detailed embodiments of the present disclosure are only for illustrating or explaining the principle of the present disclosure, rather than limiting the present disclosure. Therefore, any modifications, equivalent substitutions and improvements made within the spirit and principle of the present disclosure shall be included in the protection scope of the present disclosure. Besides, the appending claims of the present disclosure are intended to cover all changes and modifications within the scope and boundary of equivalent substitutions that fall within the scope and boundary of the claims.

The invention claimed is:

1. A sealing system for connecting a drainage device to a vehicle window glass, comprising:
a fixing section configured to be connected to a main face of the vehicle window glass; and
an engaging section configured to be detachably connected to the drainage device, the engaging section comprising a supporting body constructed and arranged to extend along at least part of a thickness of a lateral edge of the vehicle window glass to face said lateral edge when the fixing section is connected to the main face of the vehicle window glass, an elastic arm, and a transition portion connecting the supporting body to the elastic arm;
wherein the sealing system further comprises a positioning element connected to the transition portion and the supporting body, the positioning element being at least partially elastically deformable, and
wherein the positioning element comprises an elastic leg connected to the transition portion and an engaging head connected to the elastic leg and to the supporting body, with the positioning element and at least a portion of the supporting body defining together a hollow groove that extends away from the fixing section on both opposite sides of the fixing section, the engaging head having a cross section presenting a U-shape or V-shape, and the U-shape or the V-shape having an opening oriented towards the supporting body.

2. The sealing system according to claim 1, wherein the engaging head deforms and moves towards the orientation of the opening of the U-shape or the V-shape during a process of mounting the drainage device to the sealing system.

3. The sealing system according to claim 1, wherein a first side and a second side of the engaging head extending along the length direction of the sealing system are both located on a rib of the drainage device after mounting the drainage device to the sealing system.

4. The sealing system according to claim 1, wherein the drainage device, the vehicle window glass and the sealing system have flush outer surfaces after mounting the drainage device to the sealing system.

5. The sealing system according to claim 1, wherein a sealing element is further provided on the supporting body and is at least partially elastic.

6. The sealing system according to claim 5, wherein the positioning element and/or the sealing element are integrally formed with the fixing section and the engaging section.

7. The sealing system according to claim 1, wherein the positioning element and the sealing element are made of thermoplastic elastomer (TPE).

8. The sealing system according to claim 7, wherein the thermoplastic elastomer (TPE) comprises thermoplastic polyurethane (TPU) and/or thermoplastic vulcanizate (TPV).

9. The sealing system according to claim 1, wherein the fixing section and the engaging section are made of one or a combination of following materials: polyvinyl chloride (PVC), polypropylene (PP), acrylonitrile-butadiene-styrene plastic (ABS), ethylene propylene diene monomer (EPDM), polyurethane (PU), polyethylene terephthalate (PET).

10. The sealing system according to claim 1, wherein the engaging head of the positioning element has a joint guiding surface located at an upper margin of a longitudinal edge of the engaging head and an engaging surface located at a lower margin of a longitudinal edge of the engaging head.

11. The sealing system according to claim 1, wherein the fixing section and the engaging section further comprise a reinforcing insert comprising metal, organic polymer, or synthetic material.

12. The sealing system according to claim 1, wherein the supporting body has a cross section presenting a T-shape or L-shape.

13. The sealing system according to claim 1, wherein a free end of the elastic arm has a cross section presenting a hook-shape or inverted L-shape.

14. The sealing system according to claim 1, wherein the fixing section comprises a protruding supporting rib on a side away from the glass, and a buffering portion is further provided at an end of the supporting rib away from the fixing section.

15. The sealing system according to claim 1, wherein the engaging section comprises a protruding buffering portion on a side away from the positioning element.

16. The sealing system according to claim 1, wherein the engaging head and the elastic leg form a continuous structure of a same material.

* * * * *